Dec. 5, 1944.   H. W. BOUSMAN   2,364,421
IMPULSE COUNTER MOTOR
Filed Feb. 19, 1944   2 Sheets-Sheet 1

Inventor:
Henry W. Bousman,
by Harry E. Dunham
His Attorney.

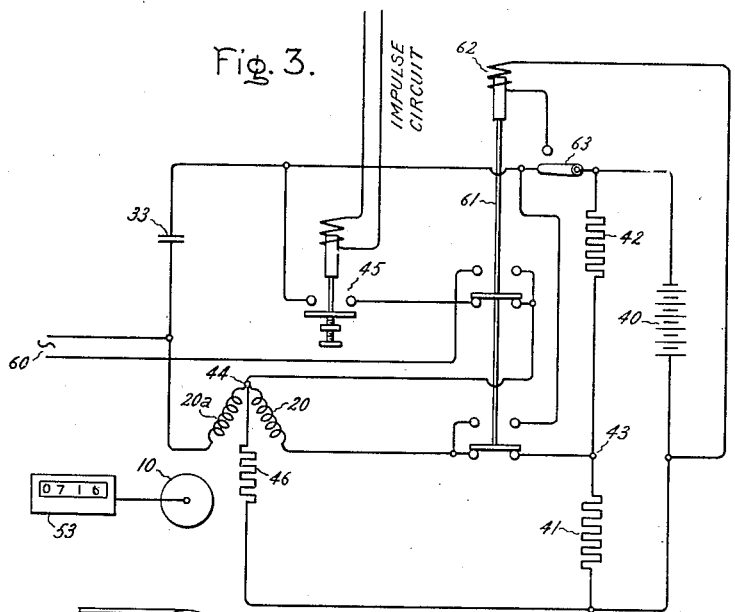
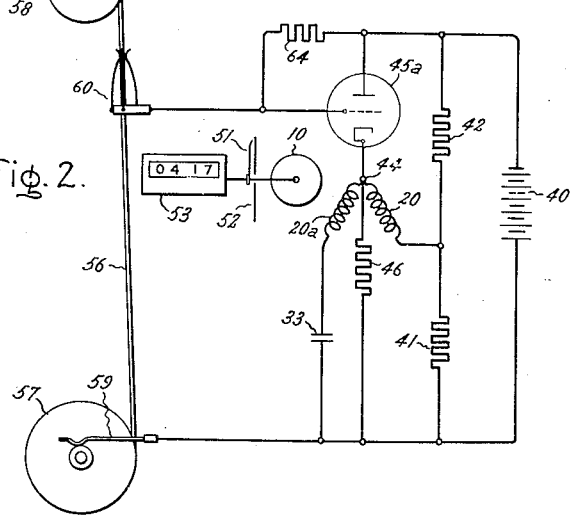

Patented Dec. 5, 1944

2,364,421

UNITED STATES PATENT OFFICE 2,364,421

IMPULSE COUNTER MOTOR

Henry W. Bousman, Scotia, N. Y., assignor to General Electric Company, a corporation of New York Application February 19, 1944, Serial No. 523,078

6 Claims. (Cl. 172—278)

My invention relates to an impulse counter motor suitable for counting impulses which may vary over a wide range of rapidity and duration involving a method of operating a split-phase alternating current condenser motor from a direct-current source. In carrying my invention into effect, I employ a synchronous inductor motor and energize the same with direct-current impulses over a resistance and condenser circuit arrangement which causes a reversal of the current in the motor windings in response to the opening and closing of an impulse circuit. The counter motor has good torque such as would be suitable for operating transmitter signaling devices, etc., and magnetically locks itself from movement except as impulses are counted.

Figure 1:
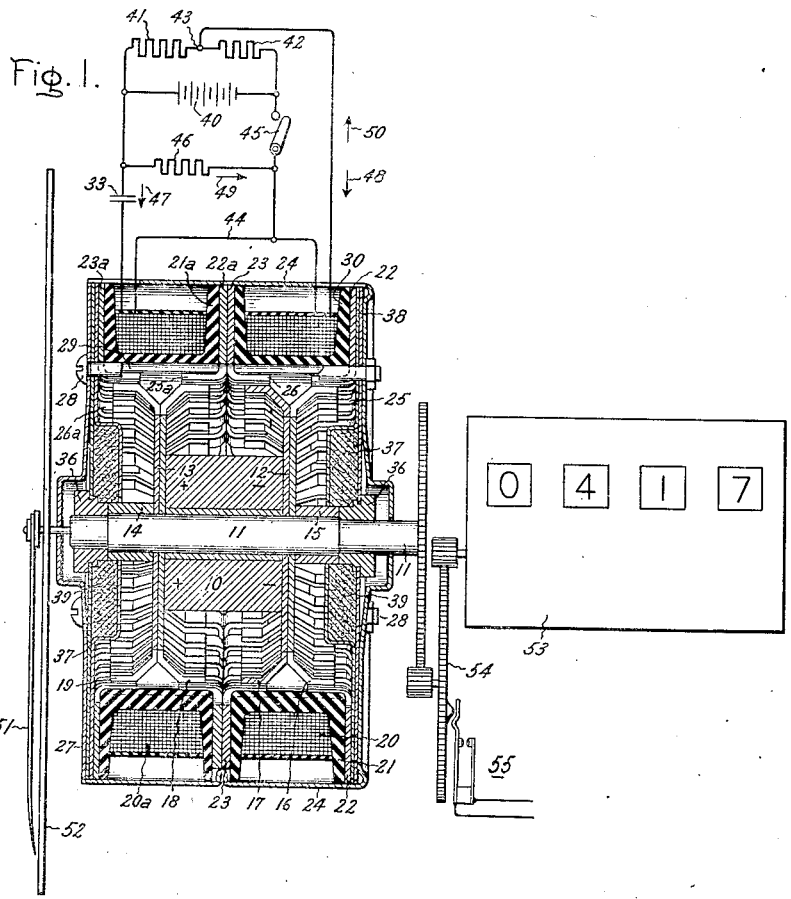
Figure 4:
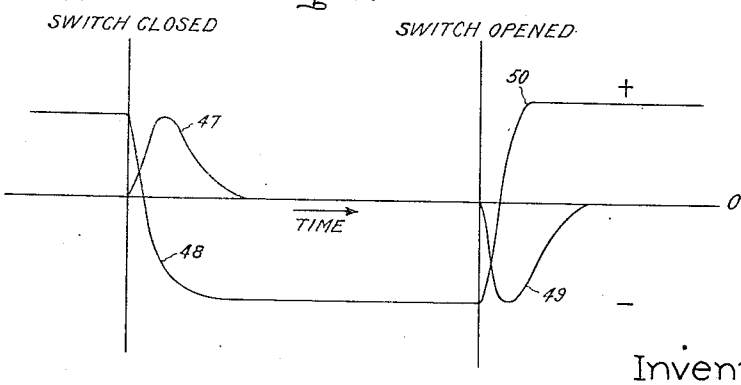

The features of my invention which are believed to be novel and patentable will be pointed out in the claims appended hereto. For a better understanding of my invention, reference is made in the following description to the accompanying drawings in which Fig. 1 represents one embodiment of my invention in which a sectional view of a suitable inductor counter motor is shown. Fig. 2 represents an embodiment of my invention where the primary impulses are feeble and serve to control an electronic switch in the motor circuit. The device is represented as used to count defects in insulation of an insulated wire under test. Fig. 3 shows a modified connection of the motor which may be employed, and a motor switching arrangement to drive the counter in a reverse direction to zero using alternating-current energy. Fig. 4 represents current impulse curves explanatory of the operation of my invention.

Referring to Fig. 1, I may use a self-starting synchronous inductor motor of the split-phase type such as is described in United States Patents No. 2,105,513, January 18, 1938, or No. 2,122,307, June 28, 1938, to Welch. A cross section of a motor such as is described in the latter patent is shown in Fig. 1. It is seen that the present motor is made up of two single-phase motor elements placed side by side and having a common permanent magnet 10 on the rotor for supplying the unidirectional flux excitation for both elements.

The shaft 11 of the motor passes through a central bore of the cylindrically shaped permanent magnet 10. Abutting against opposite ends of the permanent magnet are magnetic spider elements 12 and 13. Each such spider is shown made up of two disk-shaped plates concentric with and secured to the shaft 11 by bushings 14 and 15. The bushings have a tight fit on the shaft so that when the rotor parts are assembled and the bushings pressed on, the plates of spider elements 12 and 13 and the permanent magnet 10 are securely held to the shaft and in abutting relationship, such that one spider 12 is polarized as a south pole and the other spider 13 as a north pole by the permanent magnet 10. The peripheral edges of the spider elements have evenly spaced teeth cut therein, and the ends of these teeth are bent parallel to the shaft to form four circular, axially spaced rows of rotor teeth; the teeth in the outer plate of spider 12 are bent outwardly to form the row of teeth 16; the teeth of the inner plate of spider 12 are bent inwardly to form the row of rotor teeth 17. At the opposite end of the rotor the teeth of the inner plate of spider element 13 are bent inwardly to form the row of rotor teeth 18, and the teeth in the outer plate of spider element 13 are bent outwardly to form the row of rotor teeth 19. The teeth of spider 12 which are bent in the opposite directions are alternately spaced, that is, teeth 16 lie between teeth 17. Stator and rotor teeth overlap in the axial direction and are arranged in concentric cylindrical formation. Likewise teeth 18 and 19 of spider element 13 alternate in staggered relationship. The teeth 16 and 17 of rotor spider element 12 are shifted one-fourth tooth pitch in a given direction with respect to rotor teeth 18 and 19 respectively of rotor spider element 13.

The single-phase stator element cooperating with rotor spider element 12 comprises an annularly shaped single-phase coil 20 on an insulating spool 21 within a partially closed magnetic shell made up of washer-shaped plates 22 and 23 and an outer magnetic cup 24. The stator parts form a cylinder about the rotor and are concentric therewith and with its shaft. The coil is incased except at its inner periphery by magnetic material. The plates 22 and 23 have teeth cut in their inner peripheries which teeth are bent toward each other and parallel to the rotor teeth and lie closely adjacent thereto so that aligned rows of stator and rotor teeth are separated by a small concentric air gap. The teeth of plate 22 form the row of stator teeth designated 25 adjacent and opposite the row of rotor teeth 16. The teeth of plate 23 form the row of stator teeth 26 adjacent and opposite rotor teeth 17. The teeth 25 and 26 are separated sufficiently in the axial direction so that the single-phase flux that tends to pass between them when coil 20 is energized does so through the adjacent rows of rotor teeth 16 and 17.

The other single-phase stator element is similar to the one just described and its corresponding parts are designated by like reference characters followed by the letter *a*. The outer magnetic shell 24 is common to both stator elements and is in the form of a cup with its end wall to the right in Fig. 1 enclosing that end of the motor. The left end of the motor is enclosed by a suitable cover plate 27.

Each row of stator teeth has the same pitch or spacing as the teeth in the rotor, but the stator teeth in all rows 25, 26, 25*a*, and 26*a* are in axial alignment. Three or more bolts 28 are provided between the outer end-wall plates 27 and 24 of the motor casing to hold all of the parts together in assembled relationship. By axially aligning all of the stator teeth in the various rows, these bolts, which are made of nonmagnetic material, can be run through the motor assembly and lie in certain aligned slots between the stator teeth in the different rows. At the points where these bolts pass through the motor, a groove 29 may be cut in the inner periphery of the insulating spools 21 and 21*a*, if necessary.

As explained in Patent No. 2,122,307, if such a motor has its coils energized in parallel from a single-phase source of supply with a condenser in the circuit of one coil, the motor will be self-starting, will operate in a direction dependent upon which coil includes the condenser, and will be synchronous in operation at a speed where a rotor tooth advances one full tooth pitch per cycle. For convenience the winding in which the condenser is connected may be termed the condenser winding and the other winding may be termed the main winding.

According to my invention the motor is energized by impulses originating from a direct-current source but so controlled as to produce the same effect as when the motor is energized by alternating current, except that the frequency varies and may be anything from about the normal frequency of the motor to zero depending upon the rate of impulses to be counted.

In Fig. 1 I have shown a direct-current source 40 across which resistances 41 and 42 are connected, resistance 41 being greater than 42. The point 43 between these resistances is connected to one terminal of motor coil 20. The other end of coil 20 is connected to one end of motor coil 20*a*, and this joint connection 44 is adapted to be connected to the right side of source 40 when a switch 45 is closed. The other end of coil 20*a* is connected to the left end of source 40 through the condenser 33 and a resistance 46 is connected between the power side of condenser 33 and the common coil connection 44. If now switch 45 be closed, current will flow through coil 20*a* and condenser 33 until the condenser is charged. The direction of this charging current may be represented by arrow 47. Also, current will flow in coil 20 through resistance 41 and switch 45 and its direction may be represented by arrow 48. The last mentioned current will rise to a given value and continue to flow so long as switch 45 remains closed. These currents will have a time relation about as represented in Fig. 4. Now switch 45 is opened. Condenser 33 will discharge through coil 20*a* and resistance 46, and this discharge current will flow through coil 20*a* in the opposite direction and may be represented by arrow 49. Also, current will flow in the reverse direction in coil 20 from the left terminal of the source, resistance 46, coil 20, resistance 42 to the right terminal of source 40, and may be represented by arrow 50, and will reach a steady value. The time relation of currents 49 and 50 will be about as represented in Fig. 4. Upon closing switch 45 again, currents 47 and 48 will again flow, etc. It will be evident that the flux changes in the motor due to these impulse currents will approach that produced by out-of-phase alternating currents except that there is more or less spacing between the positive and negative half-cycles of my arrangement, depending upon the rate of opening and closing of switch 45. When the switch 45 is closed, the motor advances one-half full tooth pitch and when the switch is opened, the motor will advance another one-half full tooth pitch. Using a standard 115-volt, 60 cycle timer motor of the character described, I have obtained good results using a 250-volt, direct-current source at 40, resistances at 41 and 46 of 5000 ohms each, resistance 42, 4000 ohms, and a two microfarad condenser at 33. Using the same values except with a 125-volt, direct-current source, the operation was still satisfactory but the motor torque was somewhat less.

To use as a counter, switch 45 may be opened and closed by or in response to any operation or operations or impulses which it may be desired to count. The switch at 45 may be an electronic switch or relay, as represented in Fig. 2, where the impulses to be counted are feeble or rapid, or both. The motor shaft may be provided with a pointer 51 cooperating with a graduated scale 52, or the motor may drive a cyclometer type 53 through appropriate gearing 54, or both, and may operate alarm or signaling contacts 55 upon the completion of a predetermined impulse count. The number of impulses required to operate the motor a complete revolution will depend upon the number of motor poles or teeth. If the motor has 30 teeth in each rotor section, it will make a complete revolution on 30 complete impulses. The scale 52 will preferably be graduated accordingly. The cyclometer counter may be so geared to the motor that its unit wheel will register unit impulses without exceeding timer motor torque values when used as above explained.

It is to be observed that one coil 20 of the motor is always energized whether switch 45 be opened or closed. This coil thus produces a flux which becomes constant shortly after the switch 45 is opened or closed. This flux cooperates with the permanent magnet flux of the rotor magnetically to lock the rotor in the position to which last moved by the opening or closing of switch 45, and this is desirable because it assures that the motor will not coast or vibrate out of a correct counting rotary position between impulses. Using a 60-cycle motor, the impulses may come in at a rate of several complete impulses per second or at any slower rate, and will be counted and no harm is caused by switch 45 remaining in either position indefinitely.

In Fig. 2 the parts previously described are indicated by the reference characters used in Fig. 1. In place of switch 45, I have shown an electronic switch 34*a*. This electronic switch is controlled by the impulses to be counted, and for the purpose of illustration I have shown the apparatus arranged to count the number of defects in an insulated wire or cable represented at 56 as it is pulled off from a drum 57 over pulley 58. The inner end of the cable 56 is electrically connected to the lower end of the direct-current supply 40 through the contact 59 of drum 57. A suitable brush 60 which may be made up of a number of fine wires bearing against the insulated cable as it is pulled along has a connection to the control grid of electronic switch 45a. The grid is so biased by resistor 64 that when contact is made at 60 through defective spots in the insulation of insulated wire 56, tube 45a has its current increased, thereby reducing the potential drop on resistor 46 to the extent that the current in winding 20 is reversed. When the defective spot on the cable 56 has passed by the brush, the grid control voltage increases the tube current and restores the original current in winding 20. Thus the number of defects in the insulation of the wire in a given length are counted.

I have found that the motor counting operation is equally good if the condenser terminal of the motor be connected to the opposite side of source 40, as compared to Figs. 1 and 2, and in Fig. 3 I have shown such opposite condenser terminal connection of the motor. Thus condenser 33 will discharge when switch 45 is closed and charge when this switch is open instead of the reverse sequence characteristic of Figs. 1 and 2. The switch 45 in Fig. 3 has been shown as of the electromagnet-operated type. In this case the impulses to be counted and which energize the operating coil to close the switch 45 could be either direct-current or alternating current impulses, or both, so long as the impulse is of sufficient duration and strength to close the switch. Some selectivity between counting strong and weak impulses may be had by adjusting the relay employed.

In Fig. 3, I have also made provision for energizing the motor in the usual way from a commercial alternating-current source 60 in order quickly to drive the counter back to a zero count condition as and when desired. This involves reversing the direction of rotation of the motor. For this purpose I have provided the relay-operated switch 61 which has an operating coil 62, which may be energized from the direct-current source 40 by moving a two-way switch 63 up from the position shown. The relay 61 controls contacts for rendering the impulse counting circuits ineffective and energizing the motor from source 60 so that it will operate in a direction opposite to that in which it operates for impulse counting purposes. Thus it is seen that with relay 62 energized to operate switch 61 to the raised position, the motor windings are connected in parallel across source 60, with the condenser 33 in series with winding 20 at the same time all of the direct-current circuits through the motor are interrupted.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. In combination, a two-phase motor having main and condenser windings, a condenser, a direct current source of supply from which said motor is operated, first and second resistances connected in series across said source, a connection from between said resistances to one end of the main winding, a connection, including a switch, from the other end of said main winding to one terminal of said source, a third resistance connected between the other terminal of said source to the switch connected end of the main winding, said resistances being so proportioned that current flows from said source in one direction in the main winding when the switch is in closed condition and in the opposite direction when the switch is in the open condition, the condenser winding being connected from the switch connected end of the main winding through the condenser to one of the terminals of said source such that the condenser is charged from said source when said switch is in one of said conditions and discharges when said switch is in the other of said conditions.

2. In combination, a two-phase synchronous motor having main and condenser windings, a condenser, a direct current source of supply from which said motor is operated, first and second resistances connected in series across said source, a connection from between said resistances to one end of the main winding, a connection, including a switch, from the other end of said main winding to one terminal of said source, a third resistance connected between the other terminal of said source and the switch connected end of said main winding, said resistances being so proportioned that current flows in one direction through the main winding when the switch is in closed condition and in the opposite direction when the switch is in the open condition, the condenser winding being connected between the switch connected end of said main winding in series with said condenser to the second mentioned terminal of said source whereby said condenser charges when said switch is in the closed condition and discharges through the third resistance when the switch is in the open condition.

3. In combination, a two-phase synchronous motor having main and condenser windings, a condenser, a direct current source of supply from which said motor is operated, first and second resistances connected in series across said source, a connection from between said resistances to one end of the main winding, a connection, including a switch, from the other end of said main winding to one terminal of said source, a third resistance connected between the other terminal of said source and the switch connected end of said main winding, said resistances being so proportioned that current flows in one direction through the main winding when the switch is in closed condition and in the opposite direction when the switch is in the open condition, the condenser winding being connected between the switch connected end of said main winding in series with said condenser to the first mentioned terminal of said source whereby said condenser is charged when the switch is in the open condition and is discharged when the switch is in the closed position.

4. In combination, a two-phase motor having main and condenser windings, a condenser, a direct current source of supply from which said motor is operated, first and second resistances connected in series across said source, a connection from between said resistances to one end of the main winding, a connection, including a switch, from the other end of said main winding to one terminal of said source, a third resistance connected between the other terminal of said source to the switch connected end of the main winding, said resistances being so proportioned that current flows from said source in one direction in the main winding when the switch is in closed condition and in the opposite direction when the switch is in the open condition, the condenser winding being connected from the switch connected end of the main winding through the condenser to one of the terminals of said source such that the condenser is charged from said source when the switch is in one of said conditions and discharges when the switch is in the other of said conditions, a source of commercial frequency alternating current and switching means for simultaneously disconnecting said motor from the direct current source and connecting it to said alternating current source for operation therefrom.

5. The method of operating a split phase condenser motor from a direct current source which consists in charging a condenser through the condenser winding from said source and simultaneously energizing the other winding from said source in one direction, and then discharging the condenser through the condenser winding and simultaneously reversing the direction in which said other winding is energized from said source.

6. The method of operating a split phase condenser motor from a direct current source which consists in alternately charging the condenser from said source and discharging it, both through the condenser winding, energizing the other motor winding from said source and reversing the direction of such energization simultaneously with each condenser charging and discharging operation.

HENRY W. BOUSMAN.